(12) United States Patent
Bilancio et al.

(10) Patent No.: US 10,239,372 B2
(45) Date of Patent: Mar. 26, 2019

(54) EQUALIZER FOR SUSPENSION SYSTEM

(71) Applicant: LIPPERT COMPONENTS, INC., Elkhart, IN (US)

(72) Inventors: Dominick Bilancio, Elkhart, IN (US); Evan Whitney, Edwardsburg, MI (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 176 days.

(21) Appl. No.: 15/608,651

(22) Filed: May 30, 2017

(65) Prior Publication Data

US 2017/0349019 A1     Dec. 7, 2017

Related U.S. Application Data

(60) Provisional application No. 62/344,195, filed on Jun. 1, 2016.

(51) Int. Cl.
| | |
|---|---|
| *B60G 5/00* | (2006.01) |
| *B60G 5/04* | (2006.01) |
| *B60G 11/22* | (2006.01) |
| *B60G 11/10* | (2006.01) |

(52) U.S. Cl.
CPC .............. *B60G 5/04* (2013.01); *B60G 11/10* (2013.01); *B60G 11/22* (2013.01); *B60G 2202/14* (2013.01); *B60G 2204/121* (2013.01); *B60G 2300/04* (2013.01)

(58) Field of Classification Search
CPC .......... B60G 11/10; B60G 5/04; B60G 11/22; B60G 2202/14; B60G 2300/04; B60G 2204/121

USPC ................. 280/680, 681, 682, 687, 124.128, 280/124.163, 124.164, 124.165
See application file for complete search history.

(56) References Cited

U.S. PATENT DOCUMENTS

| | | |
|---|---|---|
| 380,548 A | 4/1888 | Braodhurst |
| 2,170,454 A | 8/1939 | Larison |
| 2,719,728 A | 10/1955 | Boyles |
| 2,811,213 A | 10/1957 | Miller |
| 2,957,058 A | 10/1960 | Trott |
| 3,003,781 A | 10/1961 | Black |
| 3,074,738 A | 1/1963 | Ward |
| 3,178,201 A | 4/1965 | Richnow, Jr. |
| 3,195,916 A | 7/1965 | Cain |
| 3,410,572 A | 11/1968 | Poulos |
| 3,499,660 A | 3/1970 | Raidel |
| 3,504,929 A | 4/1970 | King |
| 3,572,745 A | 3/1971 | Willetts |

(Continued)

OTHER PUBLICATIONS

Printout from www.truckspring.com website detailing Timbren Ride Control; Two (2) pages; Jun. 3, 2002.

(Continued)

*Primary Examiner* — Toan C To (74) *Attorney, Agent, or Firm* — Nixon & Vanderhye P.C.

(57) ABSTRACT

An equalizer includes a pivot arm pivotally connected between first and second spaced-apart plates fixedly connected to each other. First and second bump stops extend from one of the first and second plates to or toward the other of the first and second plates. A first shock absorber is disposed and selectively compressible between the pivot arm and the first bump stop. A second shock absorber is disposed and selectively compressible between the pivot arm and the second bump stop.

18 Claims, 9 Drawing Sheets

(56) References Cited

U.S. PATENT DOCUMENTS

| | | | |
|---|---|---|---|
| 3,767,222 A | 10/1973 | Willetts | |
| 3,792,871 A * | 2/1974 | Chalmers | B60G 5/04 267/292 |
| 3,799,562 A | 3/1974 | Hinchliff | |
| 3,856,325 A | 12/1974 | Willetts | |
| 4,030,738 A | 6/1977 | Willetts | |
| 4,033,606 A | 7/1977 | Ward et al. | |
| 4,109,934 A * | 8/1978 | Paton | B60G 5/04 105/198.7 |
| 4,195,863 A | 4/1980 | Richardson | |
| 4,270,765 A | 6/1981 | Legueu | |
| 4,278,271 A | 7/1981 | Raidel | |
| 4,371,189 A | 2/1983 | Raidel | |
| 4,502,707 A | 3/1985 | Jable et al. | |
| 4,504,079 A | 3/1985 | Strong | |
| 4,570,971 A | 2/1986 | Perlini | |
| 4,630,803 A | 12/1986 | Werner et al. | |
| 4,676,523 A | 6/1987 | Rogers | |
| 5,234,067 A | 8/1993 | Simard | |
| 5,431,260 A | 7/1995 | Gross et al. | |
| 5,447,324 A * | 9/1995 | Raidel, Sr. | B60G 5/04 280/676 |
| 5,486,807 A | 1/1996 | Price | |
| 5,662,314 A | 9/1997 | Stoltzfus | |
| 5,697,172 A | 12/1997 | Verseef | |
| 5,951,032 A | 9/1999 | Overby et al. | |
| 5,975,505 A | 11/1999 | Yoshimoto et al. | |
| 6,015,158 A | 1/2000 | Overby et al. | |
| 6,092,819 A | 7/2000 | Overby et al. | |
| 6,220,585 B1 | 4/2001 | Heron | |
| 6,478,321 B1 | 11/2002 | Heitzmann | |
| 7,144,031 B2 | 12/2006 | Fenton | |
| 7,296,821 B2 | 11/2007 | Fenton | |
| 7,918,478 B2 | 4/2011 | Fenton | |
| 2004/0119260 A1 * | 6/2004 | Fenton | B60G 5/00 280/124.174 |
| 2007/0063488 A1 * | 3/2007 | Dunlap | B60G 5/047 280/682 |
| 2007/0273072 A1 * | 11/2007 | Simard | B60G 5/047 267/31 |
| 2008/0036182 A1 | 2/2008 | Fenton et al. | |
| 2014/0117639 A1 * | 5/2014 | Ramsey | B60G 5/00 280/124.11 |

OTHER PUBLICATIONS

Printout of MOR/ryde Rubber Equalizer Suspension System Installation Instructions; Six (6) pages.
Printout of Dexter Axle's Hagner and Attaching Parts Kits; Two (2) pages.
Printout from www.al-kousa.com website detailing leaf spring axles; One (1) page. (Nov. 17, 2005).
Printout of the Hutch 9700 Trailer Suspension Series; Four (4) pages.
Printout of the Holland Group's Mechanical Suspension Series; Two (2) pages.
Printout from www.transport.tuthull.com website detailing Four Spring Van Slider Sluspension; One (1) page.
Printout from www. trailair.com detailing center point suspension; Three (3); 2002.
Printout of Brochure: Timbren Silent Ride Trailer Suspension.

* cited by examiner

EQUALIZER FOR SUSPENSION SYSTEM

CROSS-REFERENCE TO RELATED APPLICATION

The application claims benefit under 35 U.S.C. § 119 of U.S. Provisional Patent Application No. 62/344,195, filed on Jun. 1, 2016, the disclosure of which is hereby incorporated herein in its entirety.

BACKGROUND OF THE DISCLOSURE

A multi-axle suspension system for a vehicle may include an equalizer attached to the frame of the vehicle and to an adjacent pair of the axles. For example, an equalizer could be attached to the frame of the vehicle and between the two axles of a two-axle suspension system. Also, a first equalizer could be attached to the frame of the vehicle and between adjacent first and second axles of a three-axle suspension system, and a second equalizer could be attached to the frame and between adjacent second and third axles of the three-axle suspension system.

DETAILED DESCRIPTION OF THE DRAWINGS

References to orientation and direction, for example, upper, lower, inner, outer, front, rear, and the like, as may be used herein should be construed to refer to relative, rather than absolute, orientation and direction, unless context clearly dictates otherwise. Dimensions that may be shown in the drawings are illustrative and not limiting.

The drawings show an illustrative embodiment of an equalizer 10 for use in a suspension system including multiple axles, for example, a tandem axle suspension system as might be used on a trailer.

Figure 1:
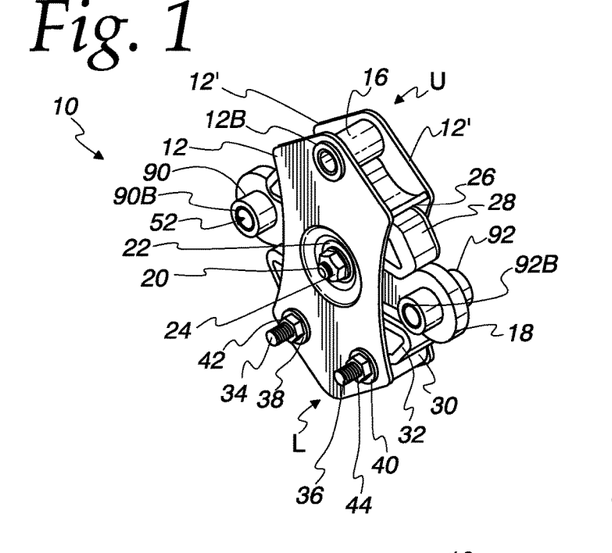
FIG. 1 is a perspective view of an equalizer for a suspension system according to the present disclosure.
Figure 2:
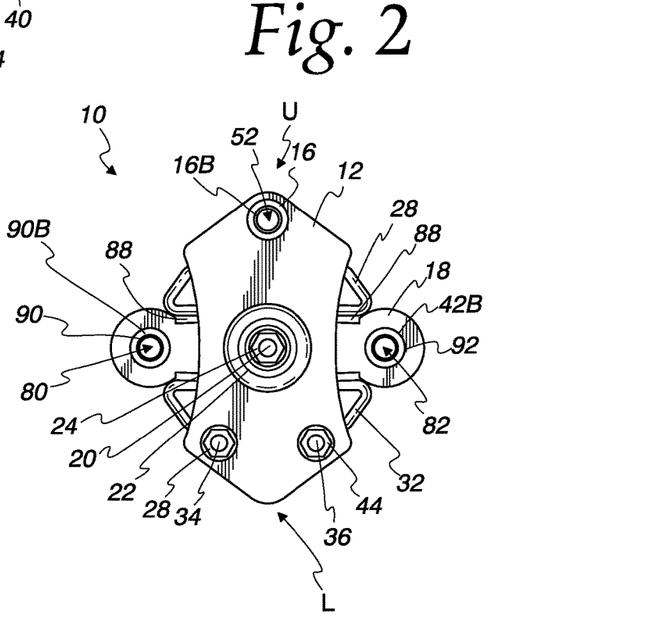
FIG. 2 is front elevation view of the equalizer of FIG. 1.
Figure 3:
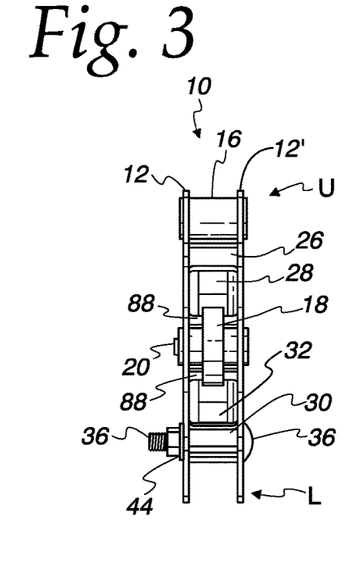
FIG. 3 is a side elevation view of the equalizer of FIG. 1.

With reference to FIGS. 1-3, the illustrative equalizer 10 includes a first plate 12 and a second plate 12'. The second plate 12' may be identical to or the mirror image of the first plate 12. As such, only the first plate 12 will be described in detail herein. Features of the second plate 12' corresponding to the features of the first plate 12 described herein may be shown in the drawings using similar but primed reference signs.

The first plate 12 and the second plate 12' are fixedly connected together proximate first (or upper or mounting) ends U thereof by an intervening mounting sleeve 16. A pivot arm 18 is pivotally mounted to the first plate 12 and the second plate 12' by a pivot bolt 20 and complementary washer 22 and nut 24. A first bump stop 26 is disposed between the first plate 12 and the second plate 12' and fixedly attached to at least one of the first plate and the second plate. A first shock absorber 28 is disposed between, and may be selectively compressed between, the pivot arm 18 and the first bump stop 26. A second bump stop 30 is disposed between the first plate 12 and the second plate 12'. The second bump stop 30 may be, but need not be, fixedly attached to at least one of the first plate 12 and the second plate 12'. A second shock absorber 32 is disposed between, and may be selectively compressed between, the second bump stop 30 and the pivot arm 18. The first plate 12 and the second plate 12' are fixedly connected together proximate second (or lower or free) ends L thereof by first and second carriage bolts 34, 36 and complementary washers 38, 40 and nuts 42, 44. In embodiments wherein the second bump stop 30 is not fixedly attached to the first plate 12 or the second plate 12', the second bump stop may be supported between the second shock absorber 32 and the carriage bolts 34, 36.

With reference to FIGS. 4-8, the first plate 12 includes a first (or upper or mounting) end section 46 proximate the upper end U thereof and a second (or lower or free) end section 48 proximate the lower end L thereof. The first and second end sections 46, 48 are connected by an intermediate section 50 having an hourglass shape. That is, the intermediate section 50 includes relatively broad upper and lower shoulders proximate the upper and lower end sections 46, 48, respectively, and it tapers to a relatively narrow waist between the upper and lower shoulders.

Figure 4:
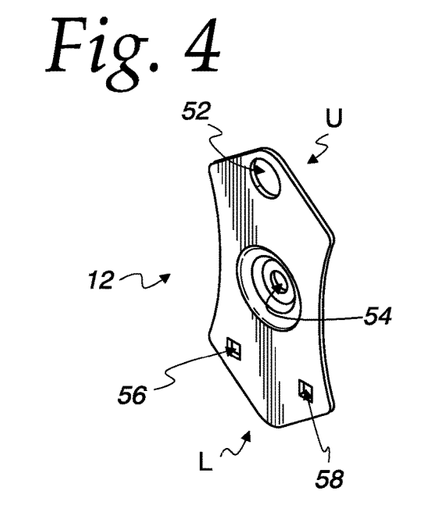
FIG. 4 is a perspective view of a first plate of the equalizer of FIG. 1.
Figure 5:
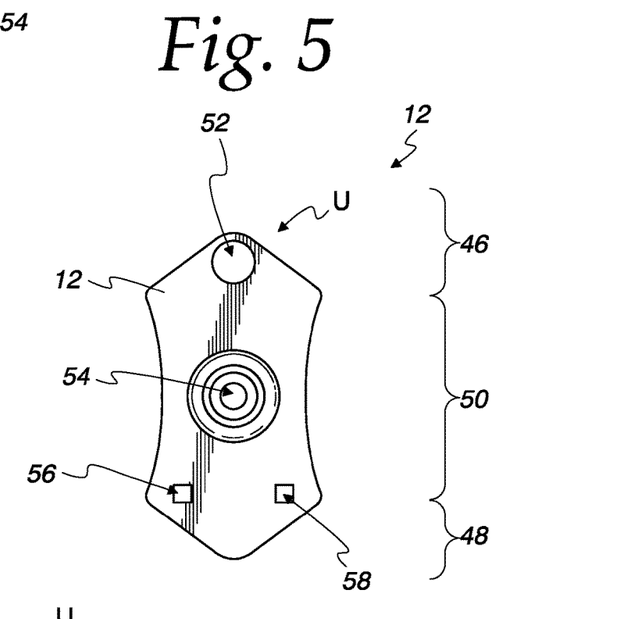
FIG. 5 is a front elevation view of the first plate of the equalizer of FIG. 1.

The first plate 12 defines a first (or upper or mounting) aperture 52 proximate the upper end U thereof. The first plate 12 also defines a second (or pivot bolt) aperture 54. The first plate 12 further defines third and fourth (or lower or carriage bolt) apertures 56, 58 proximate the transition between the lower section 48 and intermediate section 50 thereof.

The first plate 12 may be generally planar. In the illustrated embodiment, the first plate 12 is generally planar but defines a lobe 60 and a complementary countersunk portion (or countersink) 62 about the pivot arm aperture 54. The lobe 60 extends proud of a first (or inner) surface 64 of the first plate 12, and the countersink 62 is recessed from a second (or outer surface) 66 of the first plate.

Figure 6:
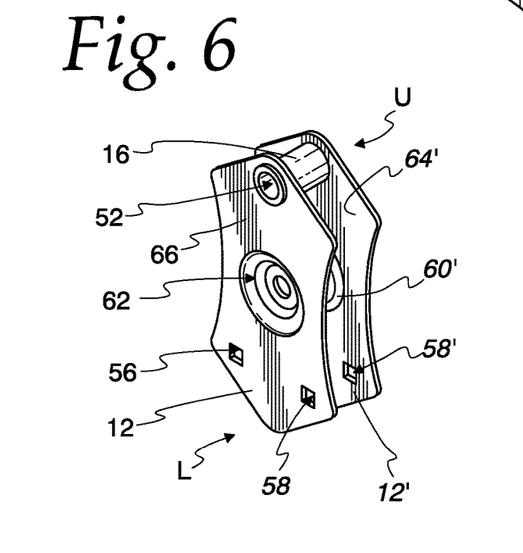
FIG. 6 is a perspective view of portion of the equalizer of FIG. 1, including the first plate, a second plate, and an intervening mounting sleeve fixedly joining the first plate to the second plate.
Figure 7:
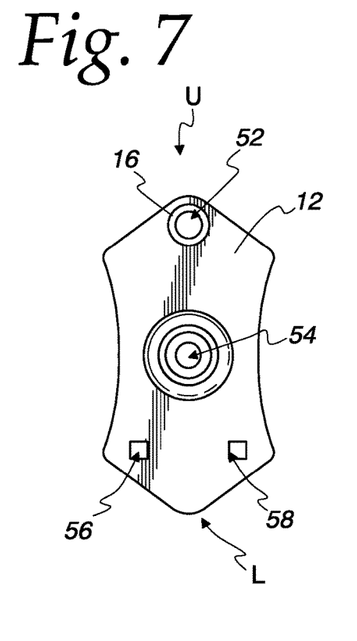
FIG. 7 is a front elevation view of the portion of the equalizer shown in FIG. 6.
Figure 8:
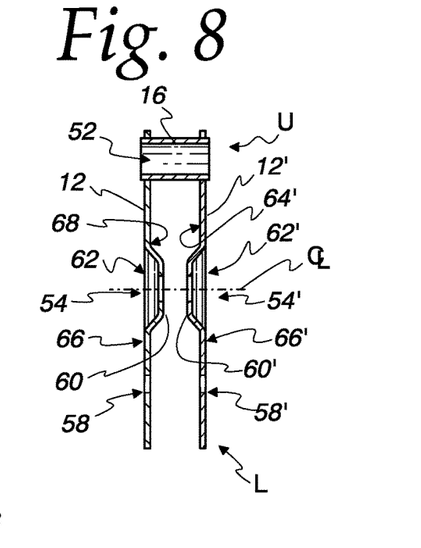
FIG. 8 is an end elevation view of the portion of the equalizer shown in FIG. 6.

As best shown in FIGS. 6 and 8, the first plate 12 and the second plate 12' may be arranged parallel to and a predetermined distance apart from each other so that respective ones of the mounting apertures 52, 52', the pivot arm apertures 54, 54', and the carriage bolt apertures 56, 56' and 58, 58' are coaxial with each other, and so that the lobes 60, 60' face inwardly toward each other. So configured and aligned, the first plate 12 and the second plate 12' may be fixed to each other by means of the mounting sleeve 16. For example, a first end of the mounting sleeve 16 may be received within the mounting aperture 52 of the first plate 12 and fixed thereto by welding. Similarly, a second end of the mounting sleeve 16 may be received within the mounting aperture 52' of the second plate 12' and fixed thereto by welding. In other embodiments, the mounting sleeve 16 could be fixed to the first plate 12 and/or the second plate 12' in other ways. A corresponding bushing 16B, for example, a bronze bushing, may be received within the mounting sleeve 16.

Figure 9:
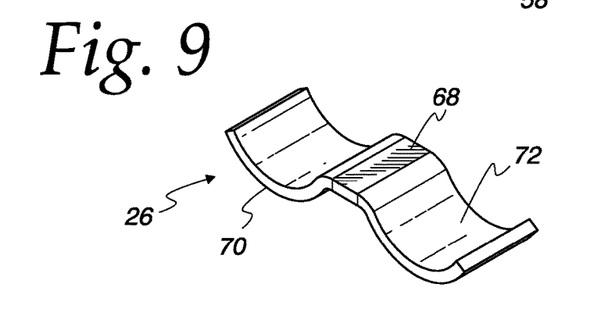
FIG. 9 is a perspective view of a bump stop of the equalizer of FIG. 1.
Figure 10:
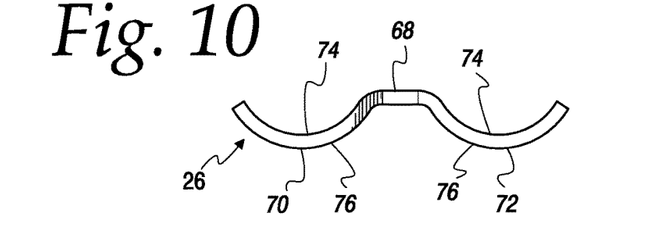
FIG. 10 is a front elevation view of the bump stop of FIG. 9.

With reference to FIGS. 9 and 10, the first bump stop 26 is shown as a plate of substantially uniform thickness formed into a flattened and rounded W shape. More specifically, the first bump stop 26 is shown as having a generally flat intermediate portion 68 flanked by first and second curved portions 70, 72, respectively. As shown, the first and second curved portions 70, 72 each define a concave upper (or first) surface 74 and a convex lower (or second or bearing) surface 76. The second bump stop 30 may be identical to or the mirror image of the first bump stop 26 or may be configured in another manner.

Figure 11:
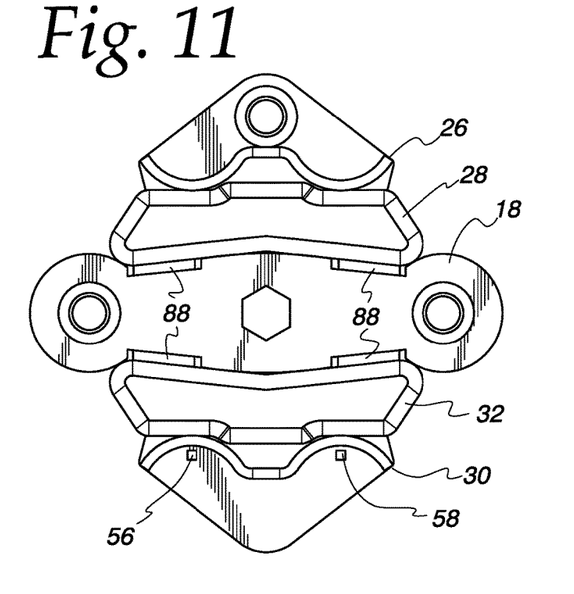
FIG. 11 is a front elevation view of the equalizer of FIG. 1 with the front side plate removed.
Figures 12, 13:
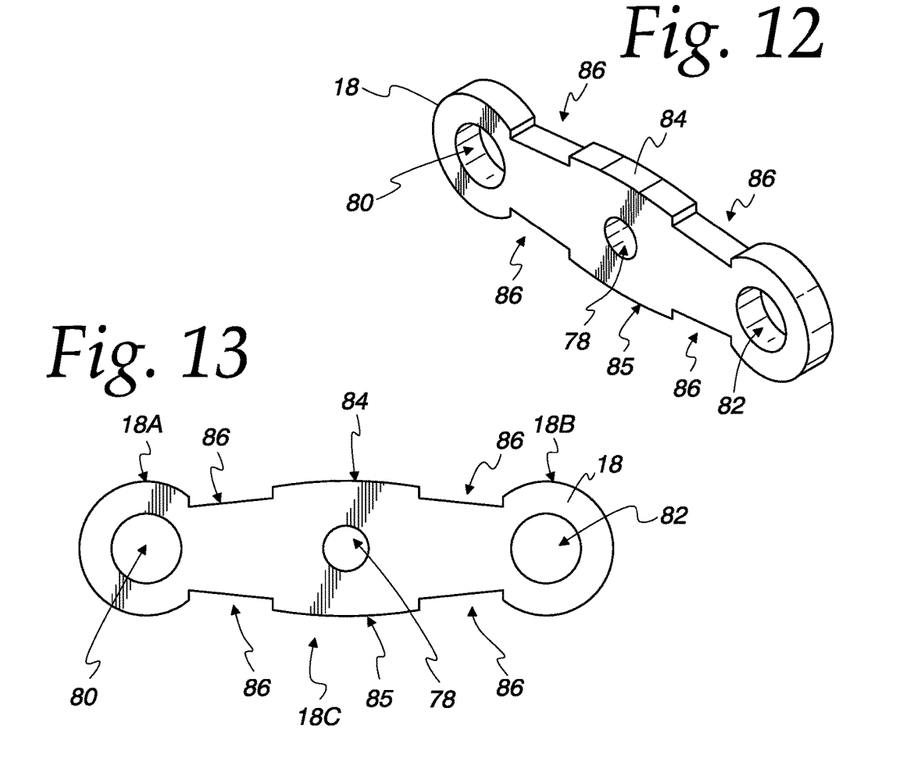
FIG. 12 is a perspective view of a pivot arm of the equalizer of FIG. 1.
FIG. 13 is a front elevation view of the pivot arm of FIG. 12.
Figure 19:
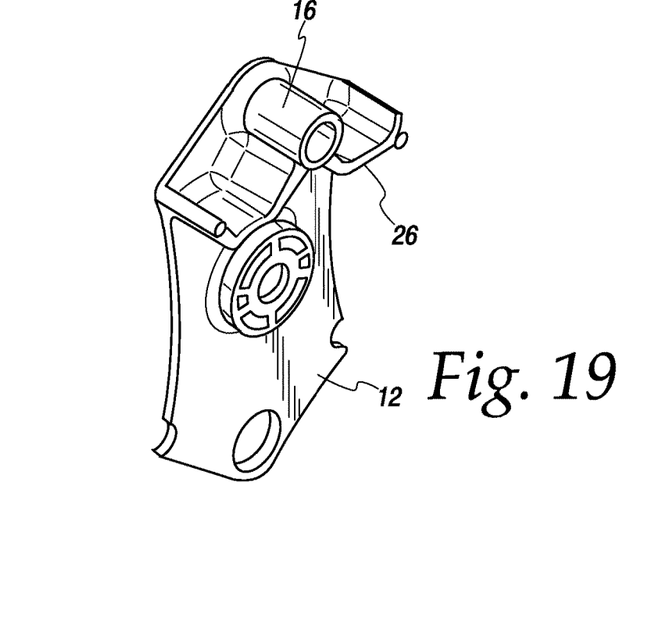
FIG. 19 is a perspective view of an embodiment of first plate and first bump stop formed monolithically.
Figures 21, 22:
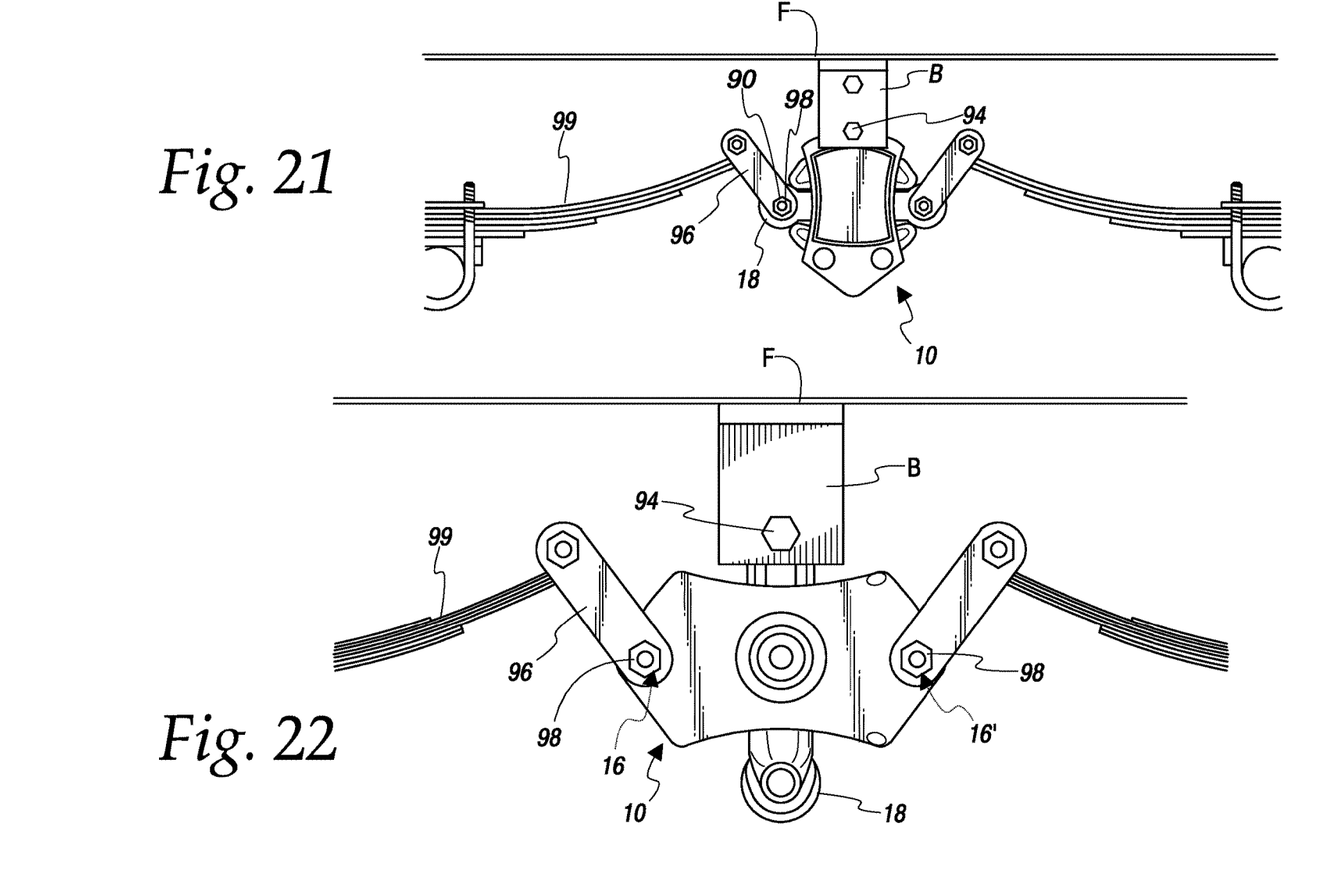
FIG. 21 is a side elevation view of the equalizer of Fig. attached between adjacent axles of a multi-axle suspension system.
FIG. 22 is a side elevation view of an alternative embodiment of an equalizer according to the present disclosure.

With reference to FIG. 11, the first and second bump stops 26, 30 may extend from one of the first plate 12 and the second plate 12' to or toward the other of the first plate and the second plate, generally perpendicular thereto. One or both of the first and second bump stops 26, 30 may be discrete elements post-attached to one or both of the plates 12, 12', for example, by welding. Alternatively, one or both of the first and second bump stops 26, 30 may be monolithically formed with either or both of the first and second side plates 12, 12'. For example, as shown in FIG. 19, the first plate 12 and the first bump stop 26 could be cast as a unitary member. The second plate 12' and second bump stop 30 could be identically formed so as to mate with the first plate 12 and the first bump stop 26. Such an embodiment is shown in 22.

With reference to FIGS. 12-17, the pivot arm 18 is shown as an elongated, generally planar plate having a first end section 18A and a second end section 18B connected by an intermediate section 18C. The first end section 18A is generally annular and defines a first pivot arm aperture 80 there through. Similarly, the second end section 18B is generally annular and defines a second pivot arm aperture 82 there through. The intermediate section 18C is generally elongated oval-shaped, and it defines a third (or intermediate) pivot arm aperture 78 there through, generally intermediate the first and second ends of the pivot arm 18 and the first and second pivot arm apertures 80, 82 defined thereby.

The pivot arm 18 defines first and second (or upper and lower) peripheral edge surfaces 84, 85. Each of the first and second edge surfaces 84, 85 defines first and second generally rectangular notches 86. A respective push plate 88 is received in each of the notches 86 and extends laterally from and is fixed to the pivot arm 18. The push plates may be fixed to the pivot arm 18 by welding or another suitable means. An outer surface 89 of each of the push plates 88 may be substantially flush with the corresponding edge surface 84, 85 of the pivot arm 18. The outer surface 89 may have a width substantially greater than that of the edge surface 84, 85 to which it is attached, thereby serving to effectively increase the area of the pivot arm 18 that may bear against the first and second shock absorbers 28, 32, as is evident from FIG. 1 and as will be discussed further below.

Figure 14:
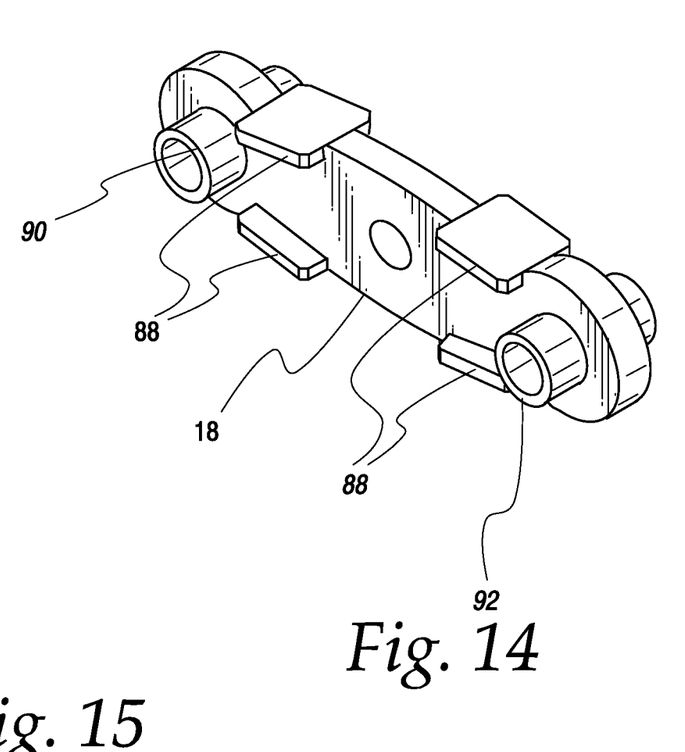
FIG. 14 is a perspective view of the pivot arm of FIG. 12 with a first pivot sleeve, a second pivot sleeve, and first through fourth bump plates attached thereto.
Figure 15:
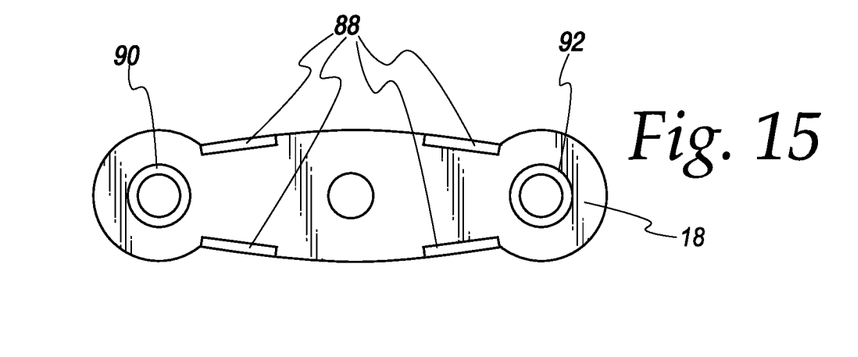
FIG. 15 is a front elevation view of the assembly of FIG. 14.
Figure 16:
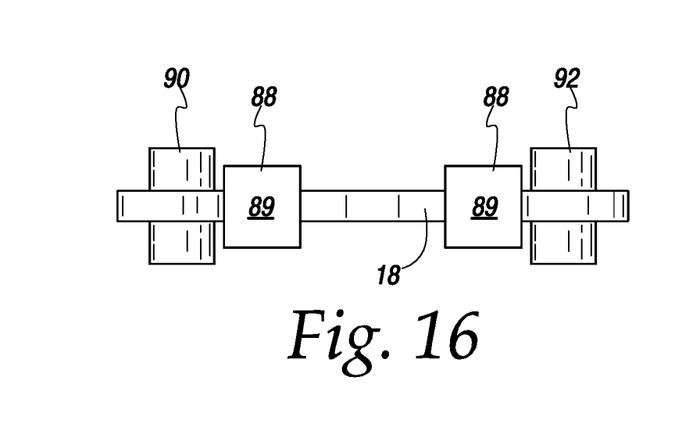
FIG. 16 is a top plan view of the assembly of FIG. 14.

A first pivot arm sleeve 90 is received by the first pivot arm aperture 80 and fixed to the pivot arm 18, for example, by welding. Similarly, a second pivot arm sleeve 92 is received by the second pivot arm aperture 82 and fixed to the pivot arm 18, for example, by welding. In other embodiments, one or both of the pivot arm sleeves 90, 92 could be fixed to the pivot arm 18 by other means.

Figure 20:
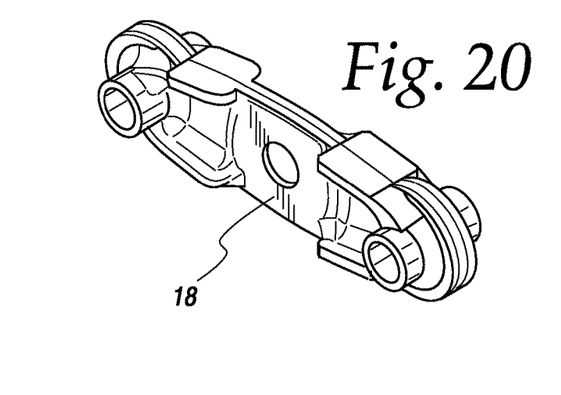
FIG. 20 is a perspective view of a pivot arm and related features formed monolithically.

In an embodiment, two or more of the plate of the pivot arm 18, the push plates 88, the first pivot arm sleeve 90, and the second pivot arm sleeve 92 could be formed monolithically, for example, by casting. For example, as shown in FIG. 20, a pivot arm comprising the features of the pivot arm 18, the push plates, 88, and the first and second pivot arm sleeves 90, 92 could be cast as a unitary member.

Each of the first and second pivot arm sleeves 90, 92 may be substantially longer than the plate of the pivot arm 18 is thick. As such, first and second ends of the first and second pivot arm sleeves 90, 92 may extend substantially beyond the ends of the respective apertures 80, 82 in the pivot arm 18. A bushing 90B, 92B, for example, a bronze bushing, may be disposed within respective ones of the first and second pivot arm sleeves 90, 92.

As suggested at the outset, the pivot arm 18 is pivotally attached to the first and second plates 12, 12' by the pivot bolt 20 extending through the intermediate aperture 54' of the second plate 12', the intermediate pivot arm aperture 78, and the intermediate aperture 54 of the first plate 12. The pivot bolt 20 may be secured thereto by the complementary washer 22 and nut 24. So attached, the pivot bolt 20 may be in pivotal engagement with the lobes 60, 60' of the first and second plates 12, 12', or loosely disposed there between. In an embodiment, the pivot arm 18 and the pivot bolt 20 could be formed monolithically.

Figure 17:
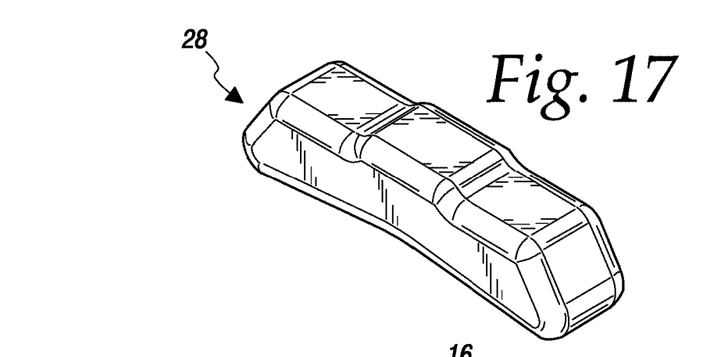
FIG. 17 is a perspective of a shock absorber of the equalizer of FIG. 1.
Figure 18:
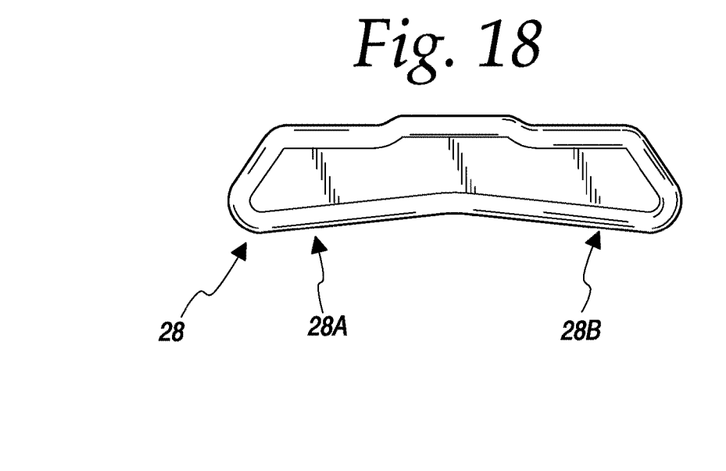
FIG. 18 is a front elevation view of the shock absorber of FIG. 17.

With reference to FIGS. 17 and 18, the first shock absorber 28 is shaped like a flattened heart symbol (♥), having first and second lobes 28A, 28B. Each of the first and second lobes 28A, 28B defines a first corresponding edge surface configured for selective compressive engagement with a corresponding edge surface 84, 85 of the pivot arm and the corresponding push plate 88 attached to the pivot arm. Each of the first and second lobes 28A, 28B also defines a second corresponding edge surface configured for selective compressive engagement with the first bump stop 26. The second shock absorber 32 is similarly configured. Each of the first and second shock absorber 28, 32 may be made of rubber or another suitable resiliently compressible material. The material's durometer may be selected as desired for an intended application.

As best shown in FIG. 11, the first shock absorber 28 is disposed between the pivot arm 18 and the first bump stop 26, with a first surface of the first shock absorber in abutment with or adjacent to the edge surface 84 of the pivot arm and a second surface of the shock absorber in abutment with or adjacent to the bearing surface(s) of the first bump stop. The second shock absorber 32 is similarly disposed between the pivot arm 18 and the second bump stop 30.

The plates 12, 12', the bump stops 26, 30, and components of the pivot arm 18 may be made of steel or another suitable, rigid material.

The equalizer 10 may be installed in a vehicle by attaching the mounting sleeve 16 to a frame of the vehicle, either directly or through a bracket or other intervening structure, and attaching the pivot arm sleeves 90, 92 to first and second axles of the vehicle, either directly, or though intervening shackles or brackets. For example, as shown in FIG. 21, the equalizer 10 may be pivotally mounted to a frame F of a vehicle through an intervening bracket B having a web attached to the frame and a pair of generally parallel flanges extending from the frame and the web by means of a mounting pivot pin 94 extending through the mounting sleeve 16 aperture and one or more corresponding apertures in the flanges of the bracket. The first end of the pivot arm 18 may be pivotally attached to a first spring shackle 96 by means of a first pivot pin 98 extending through the aperture of the first pivot arm sleeve 90 and one or more corresponding apertures in the first spring shackle. The first spring shackle 96 may be similarly pivotally attached to a first spring 99. Similarly, the second end of the pivot arm 18 may be pivotally attached to a second spring shackle by means of a second pivot pin extending through the aperture of the second pivot arm sleeve 92 and one or more corresponding apertures in the second spring shackle. The second spring shackle may be similarly pivotally attached to a second spring.

In use, application of a first moment to the pivot arm 18 in a first direction with respect to the first and second plates 12, 12' causes the pivot arm to pivot in a first direction with respect to the plates, thereby compressing respective portions of the first and second shock absorbers 28, 32 between the pivot arm the corresponding bump stops 26, 30. Application of a second moment to the pivot arm 18 in a second direction opposite the first direction with respect to the plates 12, 12' causes the pivot arm to pivot in a second direction with respect to the plates, thereby compressing respective portions of the first and second shock absorbers 28, 32 between the pivot arm and the corresponding bump stops 26, 30. When either of the first and second moment is released, the compressed portions of the first and second shock absorbers 28, 32 tend to decompress, thereby applying an opposite moment to the pivot arm 18 with respect to the plates 12, 12' and returning the pivot arm to or toward its original position with respect to the plates.

With reference to FIG. 22, in an embodiment, the equalizer 10 may be provided with a second pivot sleeve 16' similar to and opposite the pivot sleeve 16, as shown in FIG. 22. In such an embodiment, the pivot arm 18 may be pivotally attached to the frame of the vehicle or an intervening bracket B by means of a mounting pivot pin 94 extending through the aperture of the first or second pivot arm sleeve 90, 92 and one or more corresponding apertures in the frame or bracket. The equalizer 10 may be pivotally attached to the first spring shackle 96 by means of a pivot pin 98 extending through the aperture of the pivot sleeve 16 and through one or more corresponding apertures in the spring shackle. Similarly, the equalizer 10 may be pivotally attached to the second spring shackle by means of a pivot pin 98 extending through the aperture of the second pivot sleeve 16' and through one or more corresponding apertures in the second spring shackle.

Figure 23:
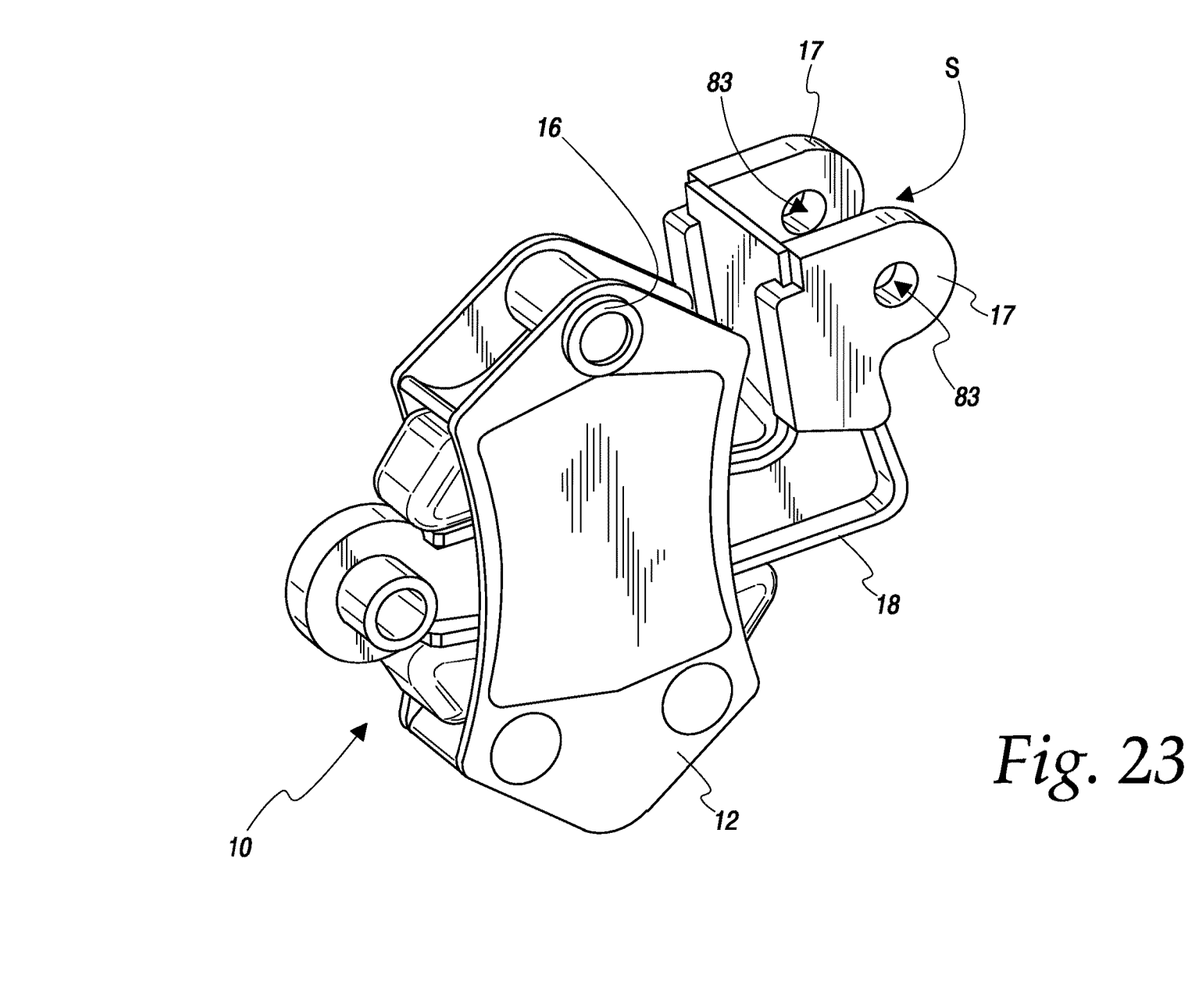
FIG. 23 is a side elevation view of another alternative embodiment of an equalizer according to the present disclosure.

With reference to FIG. 23, in an embodiment, one or both ends of the pivot arm 18 may be forked or otherwise configured to define a corresponding slot S. The slot S may be configured to receive a corresponding tongue of a spring shackle or other suspension component. The forked end may be configured as first and second parallel, opposed flanges 17 each defining a respective pivot arm aperture 83 configured to receive a corresponding pivot pin (not shown). Such a configuration of the pivot arm 18 may facilitate installation of the equalizer 10 between axles of a multi-axle suspension system, including systems with two axles and especially systems including three or more axles.

FIG. 24 shows an embodiment of an equalizer 110 similar to the equalizer 10 but including first and second U-shaped housing members 114A, 114B instead of the first and second plates 12, 12' and the second bump stop 30 of the equalizer 10. Each of the first and second housing members 114A, 114B may include a web and first and second generally parallel flanges extending from the web to define an interior region there between. The flanges of the first housing member 114A may be spaced further apart from each other than the flanges of the second housing member 114B so that the flanges of the second housing member may be received between and parallel to the flanges of the first housing member. Each of the flanges of the first and second housing members 114A, 114B defines a pivot bolt aperture 115. Each of the flanges of the second housing member 114B defines an aperture 119 configured to receive a mounting bolt 194 for mounting the equalizer 110 to a frame of a vehicle or an intervening bracket.

The flanges of the second housing member 114B may be received between the flanges of the first housing member 114A so that the respective pivot bolt apertures 115 are co-linear. A pivot arm 118 similar to the pivot arm 18 may be received between the flanges of the second housing member 114B. With the first and second housing members 114A, 114B and the pivot arm 118 so configured, a pivot bolt 120 may be inserted through the apertures 115 of the first and second housing members 114A, 114B and the pivot aperture of the pivot arm 118 to pivotally join the first and second housing members 114A, 114B and the pivot arm 118 to each other. First and second shock absorbers 128, 132 similar to the first and second shock absorbers 28, 32 may be disposed between the pivot arm 118 and the webs of the first and second housing members 114A, 114B, respectively. A first bump stop 126 similar to the first bump stop 26 of the equalizer 10 may be provided as a bearing surface for the first shock absorber 128. The second shock absorber 132 may bear directly against the web of the second housing portion 114B in lieu of a second bump stop similar to the second bump stop 30 of the equalizer 10, So assembled, the first and second housing members 114A, 114B may be fixed to each other so that they are not free to rotate with respect to each other. For example, the first and second housing members 114A, 114B may be fixed together by welding sufficient to preclude rotation of the first and second housing members with respect to each other.

Alternatively, mechanical fasteners could be used to fix the first and second housing members 114A, 114B together.

Figure 24A:
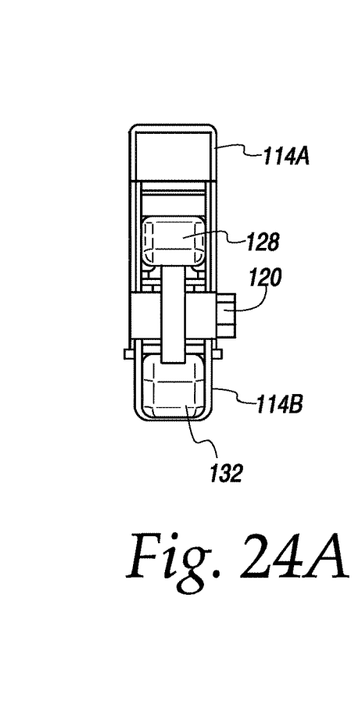
FIG. 24A is an end elevation view of a further alternative embodiment of an equalizer according to the present disclosure.
Figure 24B:
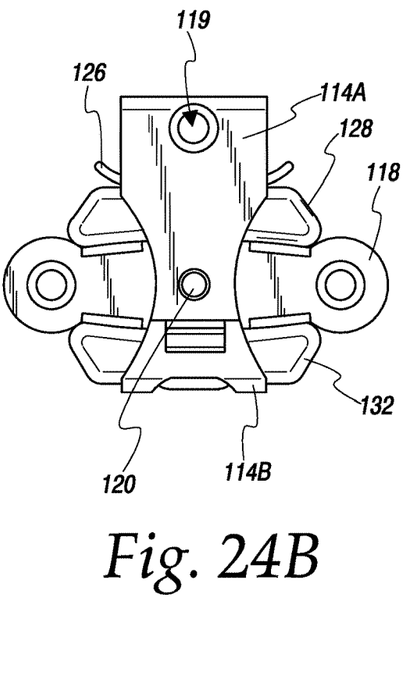
FIG. 24B is a side elevation view of the equalizer of FIG. 24A.
Figure 24C:
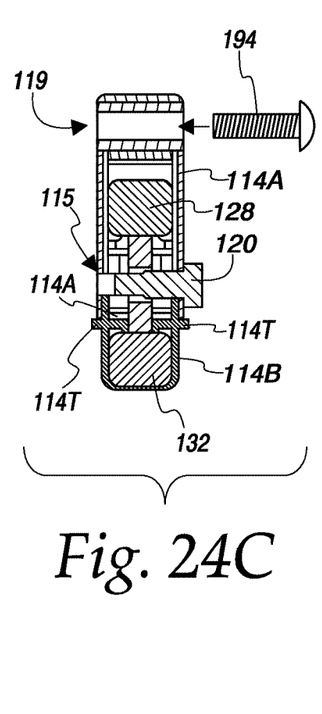
FIG. 24C is an end cross-sectional view of the equalizer of FIG. 24A.
Figure 24D:
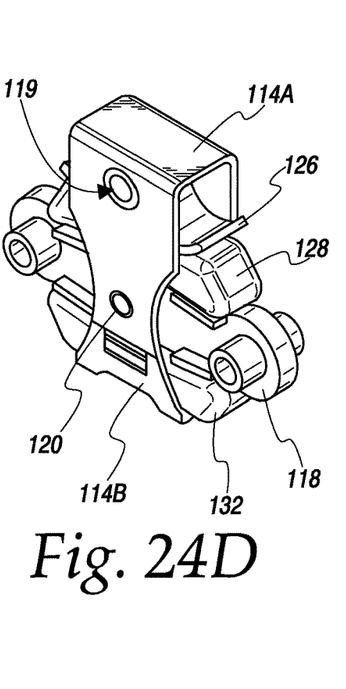
FIG. 24D is a perspective view of the equalizer of FIG. 24A.

In an embodiment, the first and second housing members 114A, 114B may include mutually interfering structure that precludes the first and second housing members from substantially rotating with respect to other without welding or mechanical fasteners. For example, as best shown in FIG. 24C, the second housing member 114B may include one or more tabs 114T extending outwardly from the free edges of the flanges of the second housing member. Such tabs 114T may abut or closely adjoin the free edges of the corresponding flanges of the first housing member 114A when the first and second housing members are assembled together. As such, the tabs 114T and free edges of the flanges of the first housing member 114A may cooperate to serve as rotation stops precluding substantial rotation of the first and second housing members 114A, 11B with respect to each other when assembled together.

The equalizer 110 may be installed to a vehicle in any of the manners discussed above. Operation of the equalizer 110 is similar to the operation of the equalizer 10.

In some embodiments, one or both of the first and second shock absorbers 28, 32 may be fixed to one or more of the first and second plates 12, 12' and the first and second bump stops 26, 30 by a vulcanizing process or another process or mechanism. (Similarly, one or both of the first and second shock absorbers 128, 132 could be similarly fixed to the respective first and second housing members 114A, 114B and or the pivot arm 118.)

The invention claimed is:

1. An equalizer for use in a suspension system having first and second axles, the equalizer comprising:
   a first plate;
   a second plate spaced from, fixed to, and generally parallel to the first plate;
   a first bump stop extending from at least one of the first plate and the second plate to or toward the other of the first plate and the second plate;
   a second bump stop extending from at least one of the first plate and the second plate to or toward the other of the first plate and the second plate;
   a pivot arm having first and second ends and an intermediate portion, the intermediate portion pivotally connected to the first plate and the second plate, the first end configured for pivotal attachment to the first axle, and the second end configured for pivotal attachment to the second axle;
   a first shock absorber disposed between the first bump stop and the pivot arm; and
   a second shock absorber disposed between the second bump stop and the pivot arm;
   wherein pivoting of the pivot arm with respect to the first plate and the second plate in a first direction of rotation results in compression of both the first shock absorber and the second shock absorber, and wherein pivoting of the pivot arm with respect to the first plate and the second plate in a second direction of rotation results in compression of both the first shock absorber and the second shock absorber.

2. The equalizer of claim 1 wherein at least one of the first bump stop and the second bump stop is monolithically formed with at least one of the first plate and the second plate.

3. The equalizer of claim 1, further comprising at least one push plate extending from the pivot arm.

4. The equalizer of claim 3 wherein the at least one push plate is monolithically formed with the pivot arm.

5. The equalizer of claim 1 further comprising a mounting sleeve connecting the first plate to the second plate, the mounting sleeve configured for pivotal connection to a frame of a vehicle.

6. The equalizer of claim 5 further comprising a bushing disposed within the mounting sleeve.

7. The equalizer of claim 1 wherein the first plate defines a first aperture and the second plate defines a second aperture corresponding to and in registration with the first aperture, the equalizer further comprising a first mechanical fastener extending through the first aperture and the second aperture, wherein the first plate, the second plate, the second shock absorber, and the first mechanical fastener cooperate to capture the second bump stop there between.

8. The equalizer of claim 7 wherein the first plate defines a third aperture and the second plate defines a fourth aperture corresponding to and in registration with the third aperture, the equalizer further comprising a second mechanical fastener extending through the third aperture and the fourth aperture, wherein the first plate, the second plate, the second shock absorber, the first mechanical fastener, and the second mechanical fastener cooperate to capture the second bump stop there between.

9. The equalizer of claim 1 wherein at least one of the first end of the pivot arm and the second end of the pivot arm defines a corresponding pivot arm aperture.

10. The equalizer of claim 9 further comprising a corresponding pivot arm sleeve extending through the corresponding pivot arm aperture.

11. An equalizer for use in a suspension system having first and second axles, the equalizer comprising:
    a first plate;
    a second plate spaced from, fixed to, and generally parallel to the first plate;
    the first plate and the second plate configured for pivotal connection to the first axle and for pivotal connection to the second axle;
    a first bump stop extending from at least one of the first plate and the second plate to or toward the other of the first plate and the second plate;
    a second bump stop extending from at least one of the first plate and the second plate to or toward the other of the first plate and the second plate;
    a pivot arm having first and second ends and an intermediate portion, the intermediate portion pivotally connected to the first plate and the second plate, at least one of the first end and the second end configured for pivotal attachment to a frame of a vehicle;
    a first shock absorber disposed between the first bump stop and the pivot arm; and
    a second shock absorber disposed between the second bump stop and the pivot arm;
    wherein pivoting of the pivot arm with respect to the first plate and the second plate in a first direction of rotation results in compression of both the first shock absorber and the second shock absorber, and wherein pivoting of the pivot arm with respect to the first plate and the second plate in a second direction of rotation results in compression of both the first shock absorber and the second shock absorber.

12. The equalizer of claim 11, wherein at least one of the first end of the pivot arm and the second end of the pivot arm defines a slot configured to receive a tongue of a suspension component.

13. An equalizer for use in a suspension system having first and second axles, the equalizer comprising:

a first U-shaped housing member having a web and first and second parallel flanges depending from the web, the first housing member configured for pivotal attachment to a frame of a vehicle;

a second U-shaped housing member having a web and first and second parallel flanges depending from the web, the first and second flanges of the second housing member nested between and secured to the first and second flanges of the first housing member, the first and second housing members cooperating to define an enclosure there between;

a pivot arm pivotally connected to the first and second flanges of the second housing member and the first and second flanges of the first housing member;

a first bump stop connected to and extending from at least one of the first flange and the second flange of the first housing member toward the other of the first flange and the second flange of the first housing member;

a first shock absorber disposed between the first bump stop and the pivot arm;

a second shock absorber disposed between the second housing member and the pivot arm;

wherein pivoting of the pivot arm with respect to the first housing member and the second housing member in a first direction of rotation results in compression of both the first shock absorber and the second shock absorber, and wherein pivoting of the pivot arm with respect to the first housing member and the second housing member in a second direction of rotation results in compression of both the first shock absorber and the second shock absorber.

14. The equalizer of claim 13 wherein the second shock absorber is disposed between the web of the second housing member and the pivot arm.

15. The equalizer of claim 13 further comprising at least one tab extending from at least one of the first flange and the second flange of the first housing member or the second housing member, the at least one tab configured to engage with a free end of a corresponding one of the first flange and the second flange of the other of the first housing member and the second housing member.

16. The equalizer of claim 13 further comprising a pivot bolt connected to the pivot arm, to the first housing member and to the second housing member.

17. The equalizer of claim 13, further comprising at least one push plate extending from the pivot arm.

18. The equalizer of claim 17 wherein the at least one push plate is monolithically formed with the pivot arm.

* * * * *